(12) United States Patent
Cavataio et al.

(10) Patent No.: US 9,764,286 B2
(45) Date of Patent: Sep. 19, 2017

(54) ZONED CATALYST SYSTEM FOR REDUCING $N_2O$ EMISSIONS

(71) Applicant: Ford Global Technologies, LLC, Dearborn, MI (US)

(72) Inventors: Giovanni Cavataio, Dearborn, MI (US); Hungwen Jen, Troy, MI (US); Carolyn Parks Hubbard, Canton, MI (US); Michael Daniel Shane, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 14/558,820

(22) Filed: Dec. 3, 2014

(65) Prior Publication Data

US 2016/0158699 A1 Jun. 9, 2016

(51) Int. Cl.
*B01D 53/94* (2006.01)
*B01J 35/00* (2006.01)
(Continued)

(52) U.S. Cl.
CPC ..... *B01D 53/9431* (2013.01); *B01D 53/9427* (2013.01); *B01J 23/63* (2013.01); *B01J 23/894* (2013.01); *B01J 35/0006* (2013.01); *B01J 35/04* (2013.01); *B01D 2255/1023* (2013.01); *B01D 2255/1025* (2013.01); *B01D 2255/20753* (2013.01); *B01D 2255/20761* (2013.01); *B01D 2255/407* (2013.01); *B01D 2255/9032* (2013.01); *B01D 2255/9035* (2013.01); *B01D 2257/402* (2013.01); *B01D 2258/012* (2013.01); *Y02C 20/10* (2013.01)

(58) Field of Classification Search
None
See application file for complete search history.

(56) References Cited

U.S. PATENT DOCUMENTS 4,172,047 A 10/1979 Gandhi et al.
5,057,483 A * 10/1991 Wan .................... B01D 53/945
423/213.5

(Continued)

FOREIGN PATENT DOCUMENTS

DE 102009017347 A1 10/2010
EP 0899002 A2 3/1999
EP 098702 B1 8/2003

*Primary Examiner* — Walter D Griffin
*Assistant Examiner* — Jelitza Perez
(74) *Attorney, Agent, or Firm* — Damian Porcari; McCoy Russell LLP

(57) ABSTRACT

A catalyst system for reducing $N_2O$ emissions in the exhaust system of a vehicle is provided and comprises a support in communication with the exhaust gas stream, with the support including an exhaust gas inlet and an exhaust gas outlet. The support has at least one exhaust gas passage therethrough. The support, which may be in the form of a monolithic, multi-cell honeycomb construction, comprises a first catalytic zone and a second catalytic zone positioned downstream from the first zone. The first catalytic zone includes rhodium or a rhodium-enriched catalyst, while the second catalytic zone includes palladium or a palladium-enriched catalyst.

9 Claims, 7 Drawing Sheets

(51) Int. Cl.
*B01J 23/63* (2006.01)
*B01J 23/89* (2006.01)
*B01J 35/04* (2006.01)

(56) References Cited

U.S. PATENT DOCUMENTS

| | | |
|---|---|---|
| 7,870,724 B2 | 1/2011 | Ura et al. |
| 8,454,917 B2 | 6/2013 | Hoyer et al. |
| 8,617,496 B2 | 12/2013 | Wei et al. |
| 2004/0001781 A1* | 1/2004 | Kumar ............... B01J 23/44 422/180 |
| 2005/0282701 A1 | 12/2005 | Foong et al. |
| 2006/0251549 A1 | 11/2006 | Kumar et al. |
| 2008/0260610 A1 | 10/2008 | Theis et al. |
| 2011/0005200 A1 | 1/2011 | Gandhi et al. |
| 2012/0128557 A1 | 5/2012 | Nunan et al. |
| 2012/0128558 A1 | 5/2012 | Nunan et al. |
| 2013/0058848 A1 | 3/2013 | Nunan et al. |
| 2013/0236380 A1 | 9/2013 | Golden et al. |

* cited by examiner

ZONED CATALYST SYSTEM FOR REDUCING $N_2O$ EMISSIONS

BACKGROUND

The subject matter described herein relates to a catalyst system which facilitates the reduction of nitrogen oxides in vehicle exhaust gases, and more particularly to a catalyst system which reduces nitrous oxide ($N_2O$) emissions from vehicle exhaust gases.

Environmental regulations pertaining to the reduction of emissions from vehicular engines are becoming increasingly stringent, requiring new designs to address the challenges of producing ever cleaner vehicles. Catalysts have long been used in the exhaust systems of automotive vehicles to convert carbon monoxide, hydrocarbons, and nitrogen oxide ($NO_x$) pollutants into more environmentally benign gases such as carbon dioxide, water vapor, and nitrogen. It has long been known that so-called three-way catalysts (TWC) can be used to simultaneously convert carbon monoxide, hydrocarbons, and nitrogen oxides into more environmentally benign gases. Generally, such TWCs include a plurality or multiple precious metals such as platinum group metals (PGMs). For example, catalysts comprised of combinations of rhodium (Rh) and platinum (Pt) or palladium (Pd) have been used in TWC systems. Generally, it is believed that Pd is more effective to convert CO and HC, while Rh is more effective to reduce $NO_x$ compounds.

Oxides of nitrogen are of an increasing environmental concern. For example, the National Research Council in a 2010 study estimated that $N_2O$ molecules released into the atmosphere stay intact for an average of 120 years, and the environmental impact of one pound of $N_2O$ on atmospheric warming is over 300 times that of one pound of carbon dioxide. Increasingly stringent fuel economy standards exacerbate the production of $NO_x$ in vehicles.

Thus, it is preferable to operate vehicle engines under lean conditions, i.e., conditions where the air/fuel ratio is greater than stoichiometric to improve fuel efficiency and lower $CO_2$ emissions. However, while lean operation improves fuel economy, such operation increase the difficulty of treating and removing $NO_x$ gases from vehicle exhaust systems. This has resulted in vehicle manufacturers developing so-called lean $NO_x$ traps which add to the complexity and cost of exhaust systems in an attempt to capture and reduce as much of the $NO_x$ as possible.

Other conditions encountered during normal operation of motor vehicles also result in the production of excess $NO_x$ gases. For example, during cold start-up of engines, the effectiveness and efficiency of the catalysts is reduced until the catalysts reach their light-off temperature. During vehicle acceleration, the increased flow of exhaust gases containing $NO_x$ and CO result in incomplete reduction of $NO_x$ compounds to $N_2$ and cause additional $N_2O$ to be generated in the catalytic converter.

Accordingly, a need remains in this art to provide more efficient catalyst systems that are able to address and control emissions of pollutant gases over a wide range of operating conditions.

BRIEF SUMMARY

Those needs are addressed by embodiments of the present invention that provide a catalyst system which facilitates the reduction of nitrogen oxides in vehicle exhaust gases, and more particularly to a catalyst system which reduces nitrous oxide ($N_2O$) emissions from vehicle exhaust gases.

In accordance with one embodiment of the present invention, a catalyst system for reducing $N_2O$ emissions in the exhaust system of a vehicle is provided and comprises a support in communication with the exhaust gas stream, with the support including an exhaust gas inlet and an exhaust gas outlet. The support has at least one exhaust gas passage therethrough. The support, which may be in the form of a monolithic, multi-cell honeycomb construction, comprises a first catalytic zone and a second catalytic zone positioned downstream from the first zone. The first catalytic zone includes a platinum group metal (PGM) catalyst comprising from about 50 to about 100 wt % rhodium, with the remainder comprising platinum and/or palladium in any weight ratio. The catalytic second zone includes a PGM catalyst comprising from about 50 to about 100 wt % palladium, with the remainder comprising platinum and/or rhodium in any weight ratio. By "PGM catalyst," we mean either rhodium, platinum, or palladium, and mixtures thereof. Preferably, the support comprises cerium oxide, zirconium oxide, aluminum oxide, and mixtures thereof in any weight ratio.

In some embodiments, the second catalytic zone includes a nickel-copper catalyst which aids in further reducing any $N_2O$ still present in the exhaust system. In some embodiments, the nickel-copper catalyst comprises about 50 wt % nickel and about 50 wt % copper.

In another embodiment, the catalyst system includes a third catalytic zone downstream from the second catalytic zone, with the nickel and copper catalyst being located in the third catalytic zone. In embodiments that include three catalytic zones, the system may be configured such that the first catalytic zone in the exhaust gas passage comprises an inlet channel having first and second ends, with the first end of the inlet channel communicating with the exhaust gas inlet. The second catalytic zone comprises an outlet channel having first and second ends, with the second end of the outlet channel communicating with the exhaust gas outlet. The third catalytic zone comprises an intermediate channel having first and second ends, with the first end of said intermediate channel communicating with the second end of the inlet channel and the second end of the intermediate channel communicating with the first end of the outlet channel. The intermediate channel is oriented such that the flow of exhaust gas through the at least one exhaust gas passage is reversed from the direction of flow in the inlet and outlet channels.

Accordingly, it is a feature of the present invention to reduce nitrogen oxides in vehicle exhaust gases, and more particularly to a catalyst system which reduces nitrous oxide ($N_2O$) emissions from vehicle exhaust gases. Other features and advantages of the present invention will be apparent from the following detailed description, the accompanying drawings, and the appended claims.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
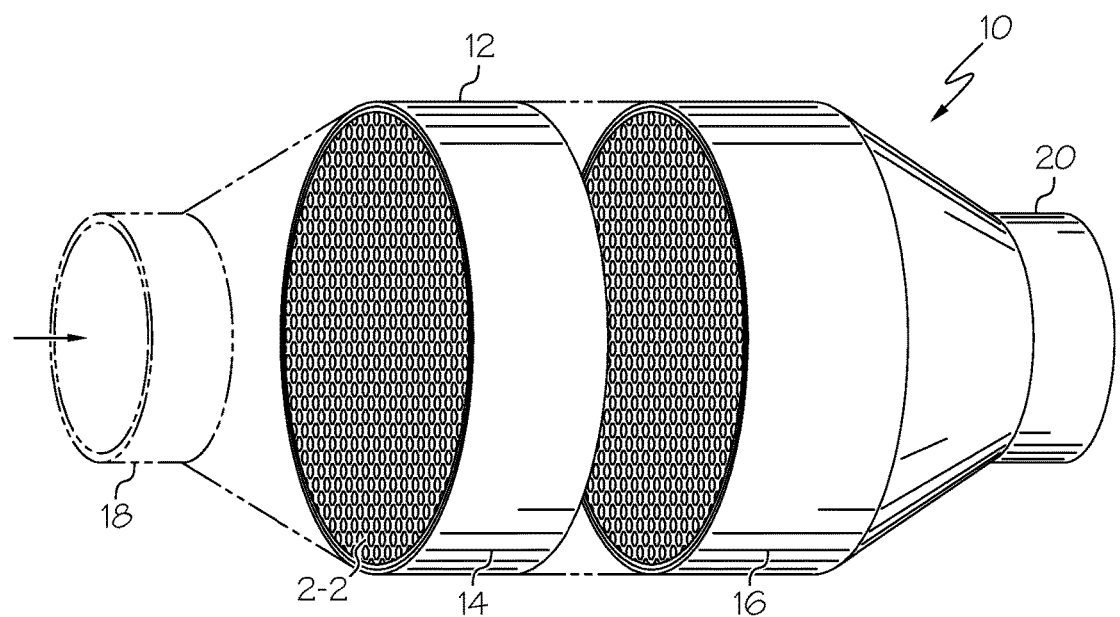
FIG. 1 is a partially cut-away, perspective side view of a prior art two-brick catalyst for a vehicle exhaust system.

The gases found in most automotive vehicle exhausts contain only very small amounts of nitrous oxide ($N_2O$) generated during fuel combustion in the engine. Rather, a problem is that $N_2O$ is formed by the catalysts in the vehicle exhaust system during different modes of operation. Nitrous oxide is formed when a vehicle is operated under lean conditions, i.e., hydrocarbon fuel is combusted in an excess of oxygen/air. While lean operating conditions provide advantages such as improved fuel efficiency and lower $CO_2$ emissions, such operation increases the formation of nitrogen oxides ($NO_x$). Typically, manufacturers have used lean $NO_x$ traps containing catalysts to absorb $NO_x$ compounds followed by $NO_x$ reduction when the engine is operated under rich (i.e., excess of fuel to air/oxygen) conditions. Alternatively, $NO_x$ reduction is accomplished by injecting a reductant such as ammonia into the exhaust gas stream.

We have determined that operating under lean, as well as rich, conditions contributes to $N_2O$ formation by conventional three-way catalysts typically used in vehicle exhaust systems. The $NO_x$ compounds that are treated when the engine is operated under lean conditions are only partially reduced by the catalysts when rich conditions or a reductant are imposed. Because conditions in the vehicle exhaust system can vary, the progression of $NO_x$ reduction is affected by the relative amounts and types of reductant ($H_2$ and CO), the reaction residence time (space velocity of the exhaust gas, defined as exhaust gas flow rate divided by catalyst volume), and temperature of the exhaust gas. When the vehicle is not fully warmed up, or when the vehicle accelerates and exhaust gas space velocity increases, $N_2O$ rather than $N_2$ is formed because the catalysts are able only to partially reduce the $NO_x$ gases.

When a vehicle accelerates, conditions in the exhaust system change. These changes include a higher exhaust flow rate, a higher mass of NO, and higher CO levels. During such challenging events, typical three way catalyst (TWC) formulations currently in use are overwhelmed. The result is that the TWC is able only to partially reduce NO, generating more $N_2O$ instead of fully reducing NO to $N_2$.

Increased space velocity of the exhaust gas during vehicle acceleration also contributes to the problem of $N_2O$ formation by lowering the temperature of the catalyst to below its optimal active state. It is during this lowered active state of the three way catalyst where the majority of $N_2O$ is generated. Current TWC formulations principally are comprised of Pd. However, CO in the exhaust gas stream can poison Pd and result in the light-off temperature of the catalyst (defined as the temperature at which the catalyst converts at least 50% of unburned hydrocarbon emissions) being raised. This further extends the time during which the TWC is in such a lowered active state and results in the generation of $N_2O$ over a wider temperature range along with significant accumulation of $N_2O$ in the exhaust gases leaving the system.

Figure 2:
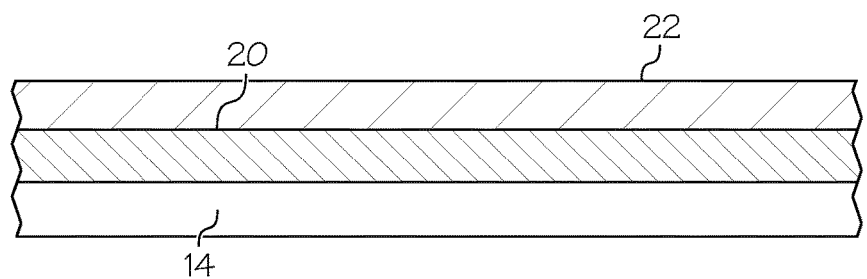
FIG. 2 is a view taken along line 2-2 in FIG. 2 depicting the washcoated layers of catalyst on the walls of the support.

Referring initially to FIGS. 1 and 2, a typical prior art two-brick catalyst configuration is shown for a vehicle exhaust system 10 located downstream from an engine (not shown). By "brick," we mean a monolithic honeycomb support substrate that has been washcoated with catalyst on the interior surfaces thereof. The system 10 includes a housing 12 which surrounds and contains catalyst supports 14 and 16. The system also includes an inlet 18 for hot exhaust gases coming from the engine and an outlet 20 where treated gases exit. As best shown in FIG. 2, the three-way catalyst 20 on first support 14 is designed to simultaneously oxidize CO and any unburned hydrocarbons as well as to reduce $NO_x$ compounds. Typically, platinum group metal compounds (PGM) such as platinum, palladium, and rhodium are used and are washcoated onto the interior surfaces of the honeycomb structure of the support.

The first support 14 typically has a high precious metal loading, such as, for example, 68 g/ft$^3$ of Pd and 2 g/ft$^3$ of Rh, for a total precious metal loading of 70 g/ft$^3$. As shown in FIG. 2, typically a first base Pd-containing catalyst 20 is washcoated onto the walls of support 14. The Rh-containing catalyst 22 is then coated onto the Pd coating to form a two-layer washcoat. It is believed that Pd is better for oxidizing CO and unburned hydrocarbons in the exhaust gas stream, while Rh is better for $NO_x$ reduction. Typically, the monolithic substrate has between about 400 to about 1200, and more preferably about 900cells per square inch to increase the geometric surface area of the washcoat.

The second support 16 is located downstream from the first support 14 and is present to aid in controlling emissions during high mass flux situations which occur during acceleration and highway-type driving. The second support 24 is designed to provide additional $NO_x$ conversion. Typically, the second support precious metal loadings are generally much lower, for example, 10 g/ft$^3$ Pd and 2 g/ft$^3$ Rh.

With such a typical catalyst support configuration and composition, we have determined that during vehicle acceleration, the catalyst on the first support generates $N_2O$ due to the incomplete reduction of $NO_x$ compounds by the three way catalyst and the presence of higher levels of carbon monoxide which inhibit the activity of the three-way catalyst. The catalyst on the second support is not effective to significantly reduce the $N_2O$ content of the exhaust.

To address the shortcomings of current catalytic exhaust systems, embodiments of the present invention utilize a zoned catalyst system that includes a first zone that comprises rhodium or a rhodium-enriched catalyst and a second zone, positioned downstream from the first zone, that comprises palladium or a palladium-enriched catalyst. The catalyst zones may be located on separate catalyst support structures positioned in sequence. Alternatively, the catalyst zones may be positioned sequentially on a single catalyst support.

The catalyst support or supports are preferably positioned close to the exhaust gas manifold of the engine to receive the hot exhaust gases therefrom. This configuration is termed in the art a "close-coupled" catalyst and is designed to provide faster catalyst light off (e.g., the catalyst is heated and reaches its light off temperature more quickly) after a cold start of the vehicle. Optionally, the second catalytic zone may include a nickel-copper catalyst. Alternatively, the nickel-copper catalyst may be positioned in a third catalytic zone located downstream from the second catalytic zone.

Figure 3:
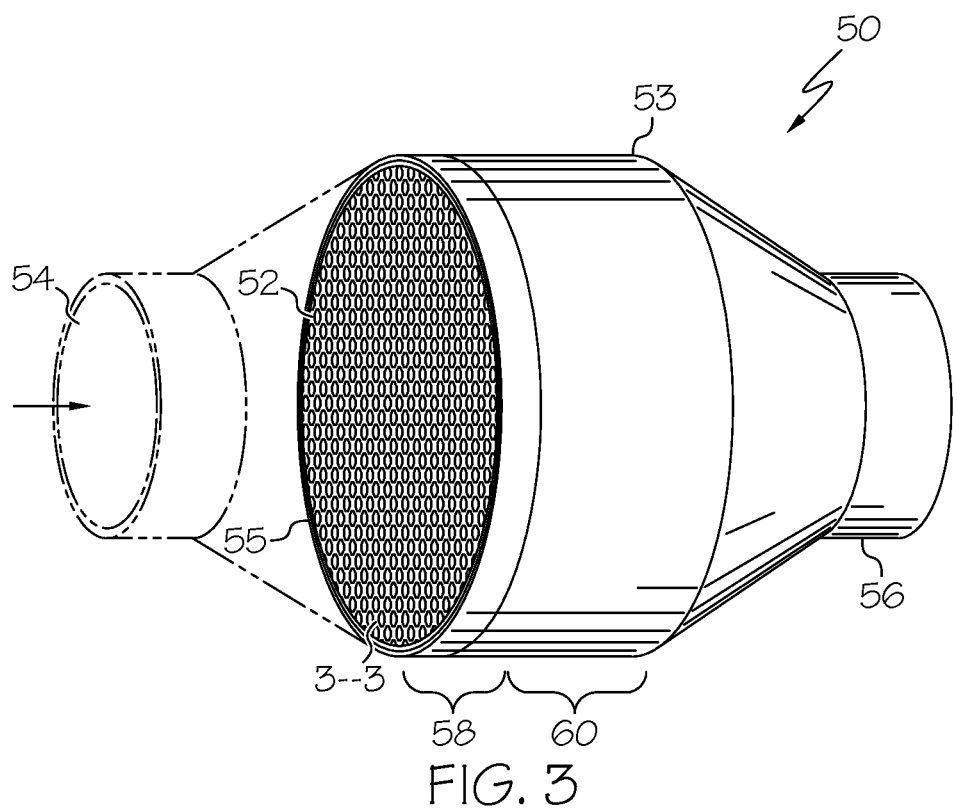
FIG. 3 is a partially cut-away, perspective side view of one embodiment of the two-zone catalytic system of the present invention.
Figure 3A:
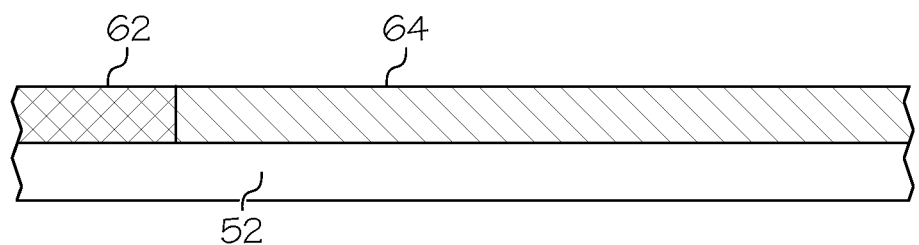
FIG. 3A is an enlarged side view taken along line 3-3 in FIG. 3.

As shown in FIGS. 3 and 3A, in one embodiment the catalyst system 50 includes a catalyst support 52 in a housing 53. Support 52 is illustrated in the form of a monolithic honeycomb having multiple exhaust gas passages therethrough. Preferably, the support is formed of cerium oxide, zirconium oxide, aluminum oxide, and mixtures thereof. The system includes an exhaust gas inlet 54 and an exhaust gas outlet 56. Support 52 includes a first catalytic zone 58 and a second catalytic zone 60 positioned immediately downstream from the first zone. First zone 58 has a platinum group metal (PGM) catalyst comprising a rhodium or rhodium-enriched catalyst 62 coated onto the walls of support 52, while second zone 60 has a PGM catalyst comprising a palladium or palladium-enriched catalyst 64 coated onto the walls of the support. By "PGM catalyst," we mean either rhodium, platinum, or palladium.

Generally, the first catalyst zone comprises from about 5 to about 35% of the length of the support. In a preferred embodiment, the first catalyst zone comprises from about 8 to about 30% of the length. If the two catalyst zones are positioned on separate supports, the relative lengths will be in the same ratio. The catalyst in the first zone comprises from about 50 to about 100 wt % rhodium, with the remainder comprising palladium and/or platinum in any weight ratio. Thus, the amount of palladium in the first catalytic zone may vary from 0 to about 50 wt. % and the amount of platinum in the first catalytic zone may vary from 0 to about 50 wt. %. The catalyst loading for the first zone is between about 0.5 and about 300 gm/ft$^3$.

The catalyst in the second zone comprises from about 50 to about 100 wt % palladium, with the remainder comprising platinum and/or rhodium in any weight ratio. Thus, the amount of rhodium in the second catalytic zone may vary from 0 to about 50 wt. % and the amount of platinum in the second catalytic zone may vary from 0 to about 50 wt. %. The catalyst loading in the second zone comprises from about 0.5 to about 300 gm/ft$^3$.

By locating the rhodium or rhodium-enriched catalyst so that engine exhaust gases encounter it first, $NO_x$ conversion is enhanced while $N_2O$ formation is minimized. While not wishing to be bound by any particular theory, vehicle acceleration events are characterized by higher exhaust gas flow rates, with the exhaust gases containing relatively greater amounts of $NO_x$ and CO. Under lower temperature and CO rich reaction conditions, rhodium has a lower light off temperature than palladium, with 50% $NO_x$ reduction occurring at about 300° C. for rhodium versus about 400° C. for palladium.

Rhodium has the additional advantage in that it is a good water gas shift reaction catalyst, converting the CO present in the exhaust gas to $CO_2$ and $H_2$. The catalytic activity of rhodium is not adversely affected by CO, more CO is converted, and less CO is present in the downstream exhaust gas which avoids adversely affecting the catalytic activity of the palladium catalyst zone. Further, the $H_2$ produced in the rhodium catalytic zone is utilized by the downstream palladium or palladium-enriched catalyst to enhance the conversion of any remaining $N_2O$ in the exhaust stream.

In another embodiment, the second catalytic zone 60 includes a nickel-copper catalyst booster that enhances the conversion unburned hydrocarbons, carbon monoxide, $NO_x$, $N_2O$, and $NH_3$. The catalyst loading for the nickel-copper catalyst is from about 0.5 to about 2000 gm/ft$^3$ total nickel and copper. The weight ratio of nickel to copper may vary widely from about 1:99 to about 99:1. Preferably, the nickel to copper weight ratio (Ni/Cu) is >1.

Figure 4:
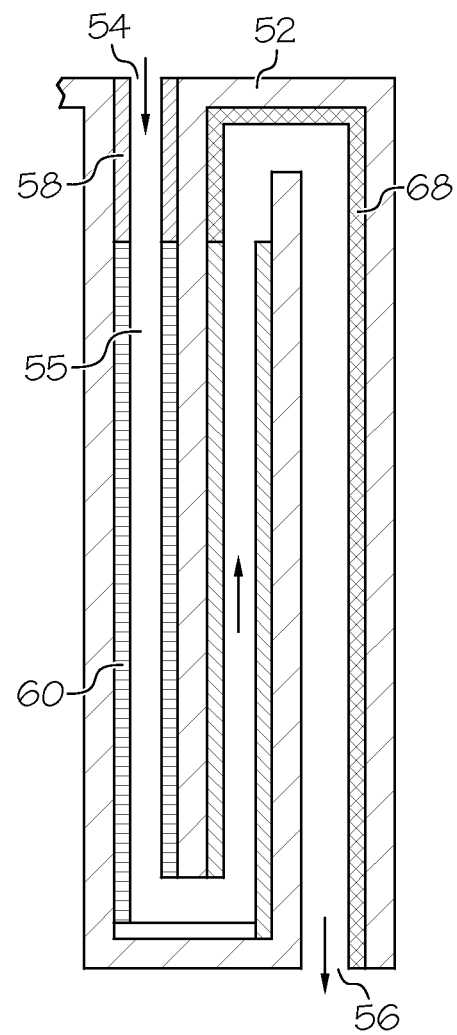
FIG. 4 is a schematic side view of a reverse flow embodiment of the invention that utilizes a third catalytic zone.
Figure 5:
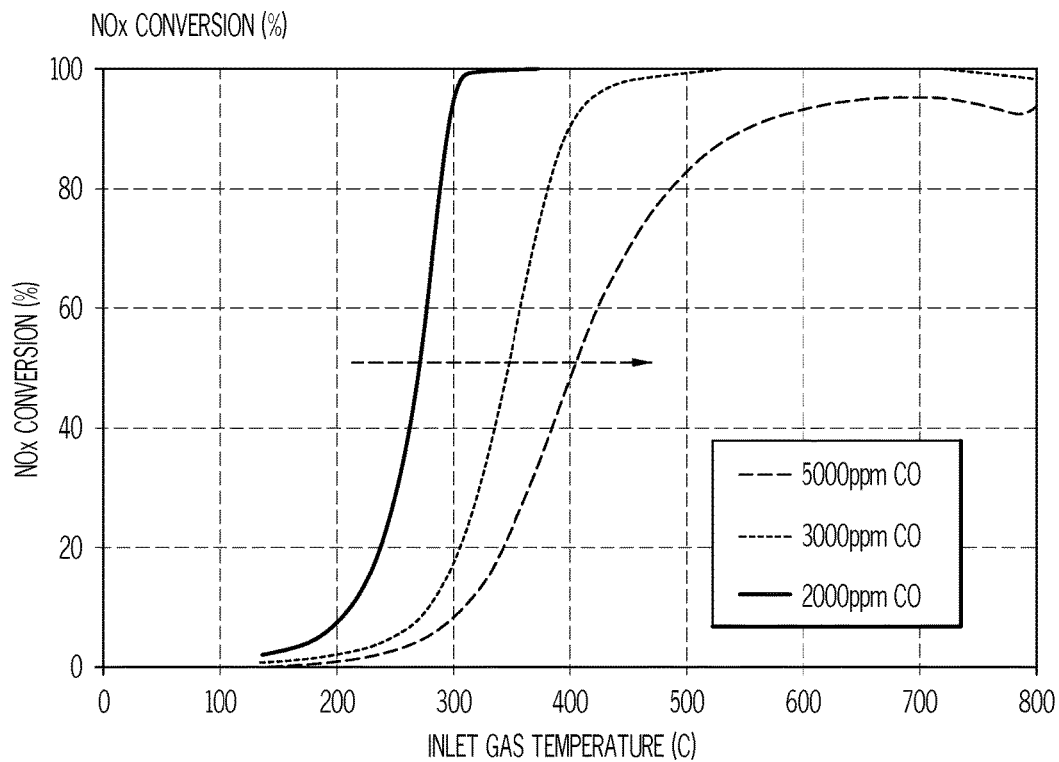
FIG. 5 is a plot of $NO_x$ conversion versus inlet gas temperature for a Pd only catalyst under varying CO content in an exhaust gas.
Figure 6:
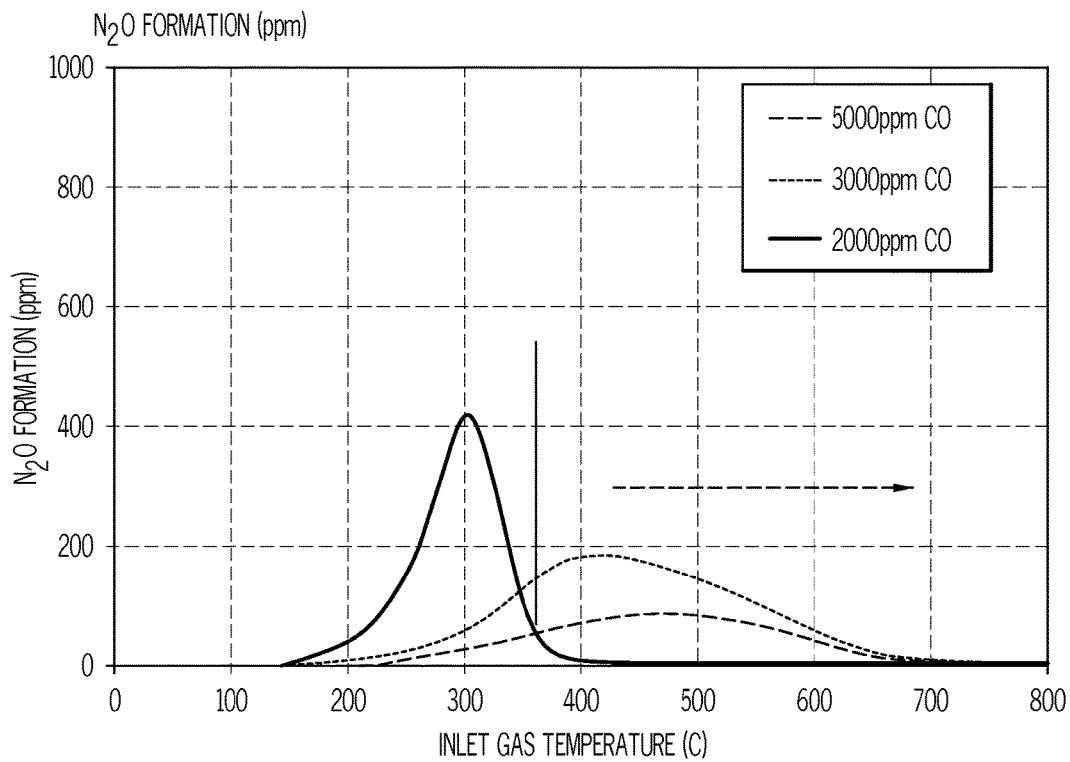
FIG. 6 is a plot of $N_2O$ formation versus inlet gas temperature for a Pd only catalyst under varying CO content in an exhaust gas.
Figure 7:
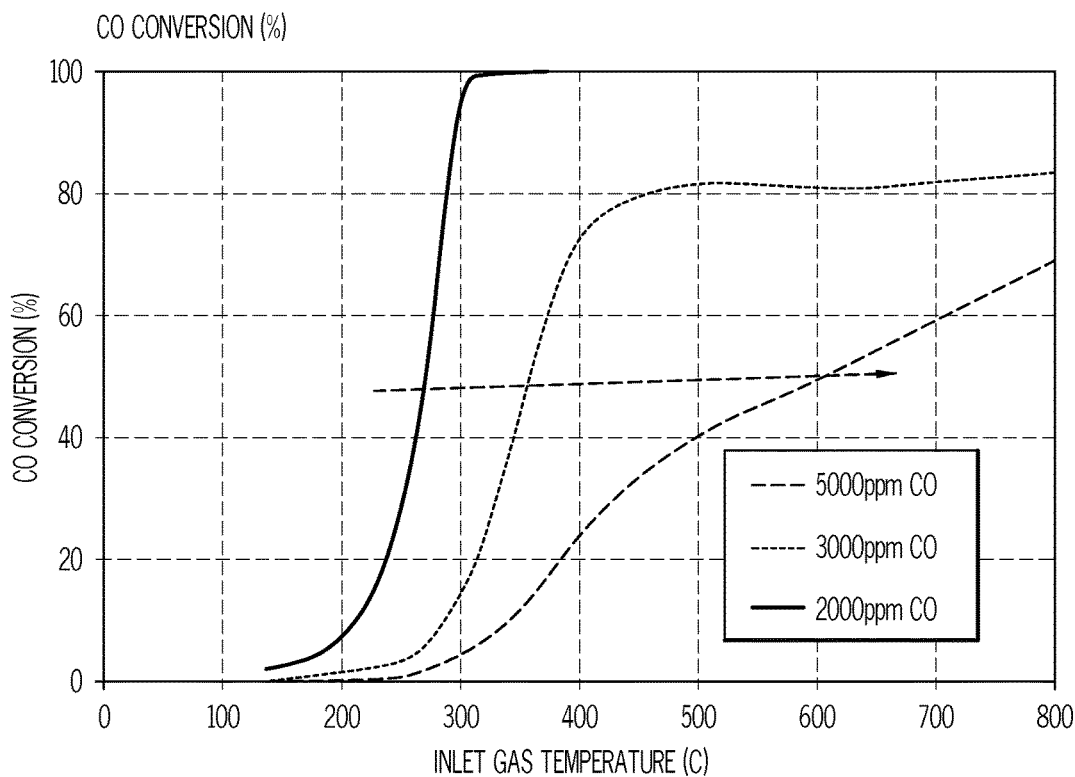
FIG. 7 is a plot of CO conversion versus inlet gas temperature for a Pd only catalyst under varying CO content in an exhaust gas.

Alternatively, the nickel-copper catalyst may be positioned in a third catalyst zone downstream from the second zone. In one simplified three-zone embodiment illustrated in FIG. 4, the catalyst support is configured to create a reverse flow arrangement. As shown, exhaust gas (depicted by arrows) from the engine (not shown) enters support 52 through gas inlet 54 and flows through gas passage 55. The exhaust gas is initially exposed to rhodium or rhodium-enriched first catalytic zone 58, shown as a washcoat on the walls of support 52. As the exhaust gas continues along gas passage 55 it is then exposed to the palladium or palladium-enriched second catalytic zone 60, shown as a washcoat on the walls of support 52. As the exhaust gas continues through passage 55, it is then exposed to the nickel-copper third catalytic zone 68 before exiting through outlet 56. Those skilled in the art will recognize that through the use of manifolds, a multi-passage honeycomb support can be configured for this reverse flow embodiment. For example, by the appropriate use of manifolds, exhaust gas may be directed into the interior core of a honeycomb support and flow through the passages in the interior core. Upon exiting the support, manifolds direct the exhaust gas flow in a reverse flow direction through an intermediate zone around the interior core. Finally, upon exiting the intermediate zone, manifolds direct the exhaust gas through a zone adjacent the exterior surface of the catalytic support. The embodiment shown in FIG. 4 achieves the same advantages of previous embodiments, namely that $NO_x$ conversion is enhanced while $N_2O$ formation is minimized.

In order that embodiments of the invention may be better understood, reference is made to the following examples which are intended to illustrate the various embodiments of the invention and are not intended to limit the scope thereof.

EXAMPLE

Laboratory tests were run to simulate vehicle acceleration conditions for an exhaust having rich CO levels, i.e., levels of CO greater than stoichiometric for the reaction 2NO+CO→$N_2$+$CO_2$. Two different catalysts were compared. The first catalyst comprised rhodium at a level of 26 g/ft$^3$. The second catalyst comprised Pd at a level of 26 g/ft$^3$. In each instance, the catalysts were washcoated onto the walls of a ceria/zirconia honeycomb support 1 inch in diameter and 0.5 inches in length having 400 cells per square inch and a 0.004 inch wall thickness. The evaluation parameters were simulated exhaust gas at a space velocity of 60,000/hr and a reactor total flow rate of 6.44 liters/min. Both catalysts were aged for 16 hrs. at 900° C. under hydrothermal conditions.

Figure 8:
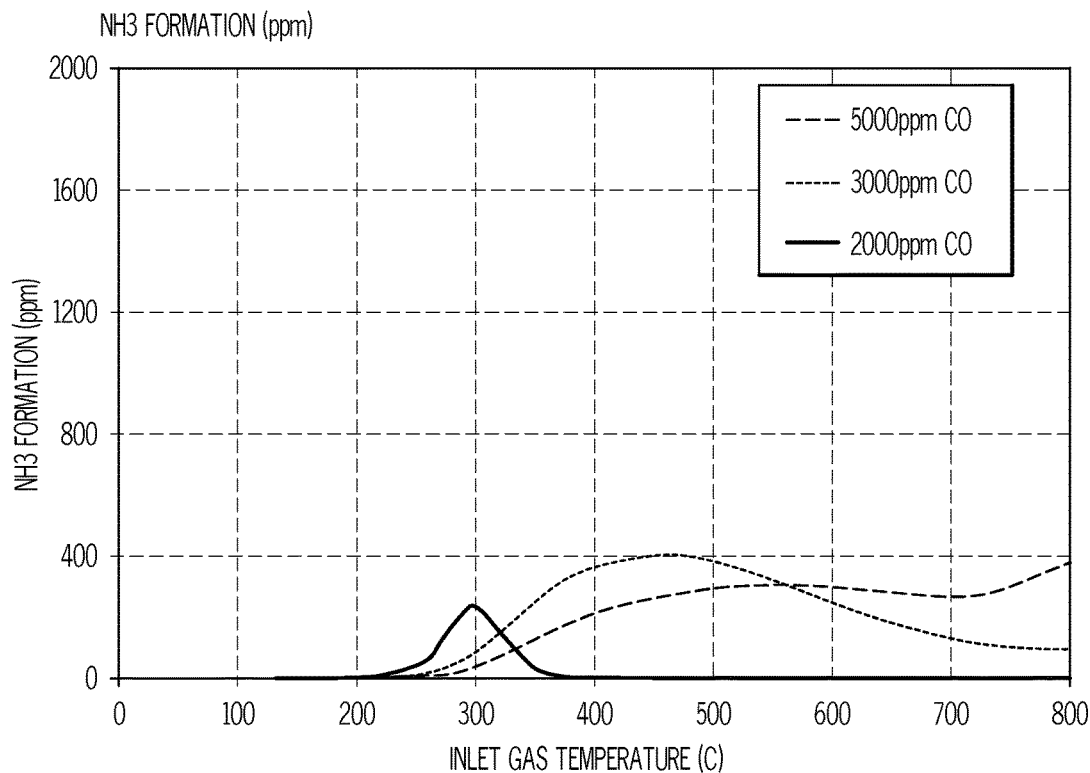
FIG. 8 is a plot of $NH_3$ formation versus inlet gas temperature for a Pd only catalyst under varying CO content in an exhaust gas.
Figure 9:
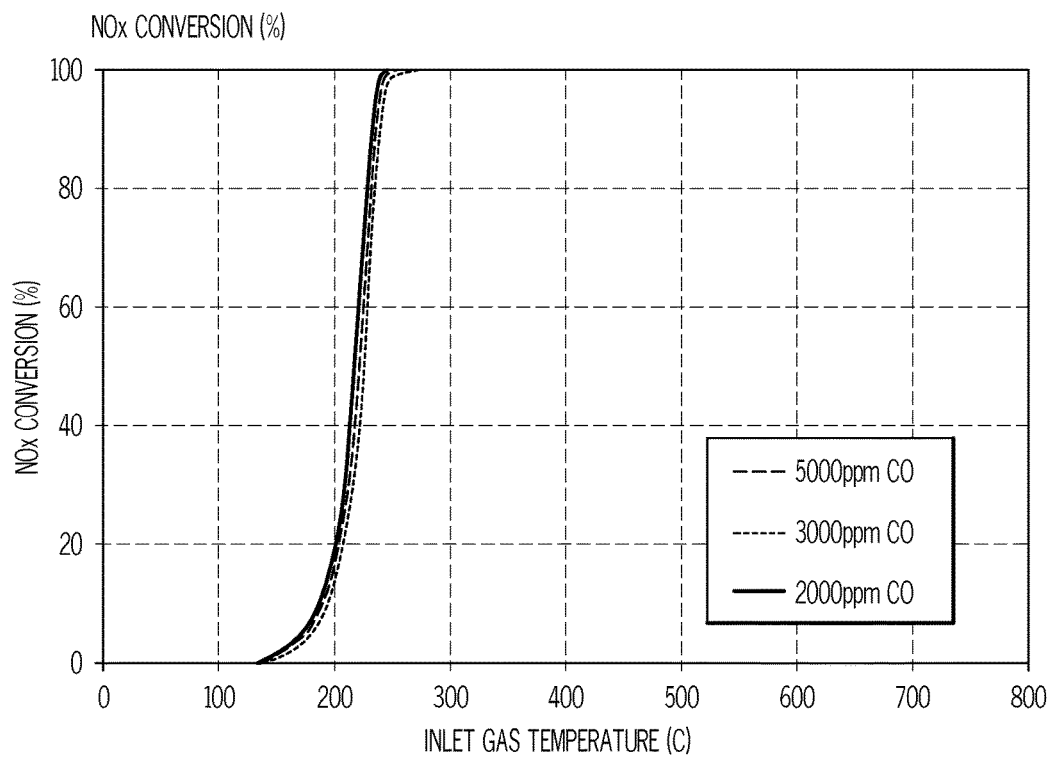
FIG. 9 is a plot of $NO_x$ conversion versus inlet gas temperature for a Rh only catalyst under varying CO content in an exhaust gas.
Figure 10:
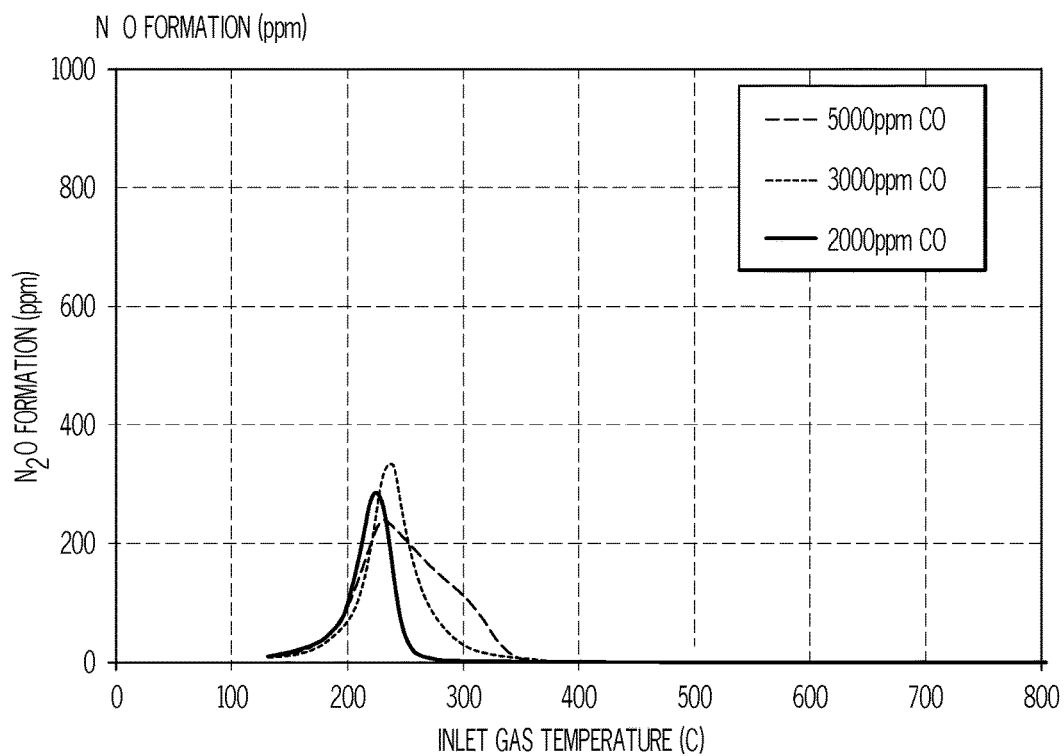
FIG. 10 is a plot of $N_2O$ formation versus inlet gas temperature for a Rh only catalyst under varying CO content in an exhaust gas.
Figure 11:
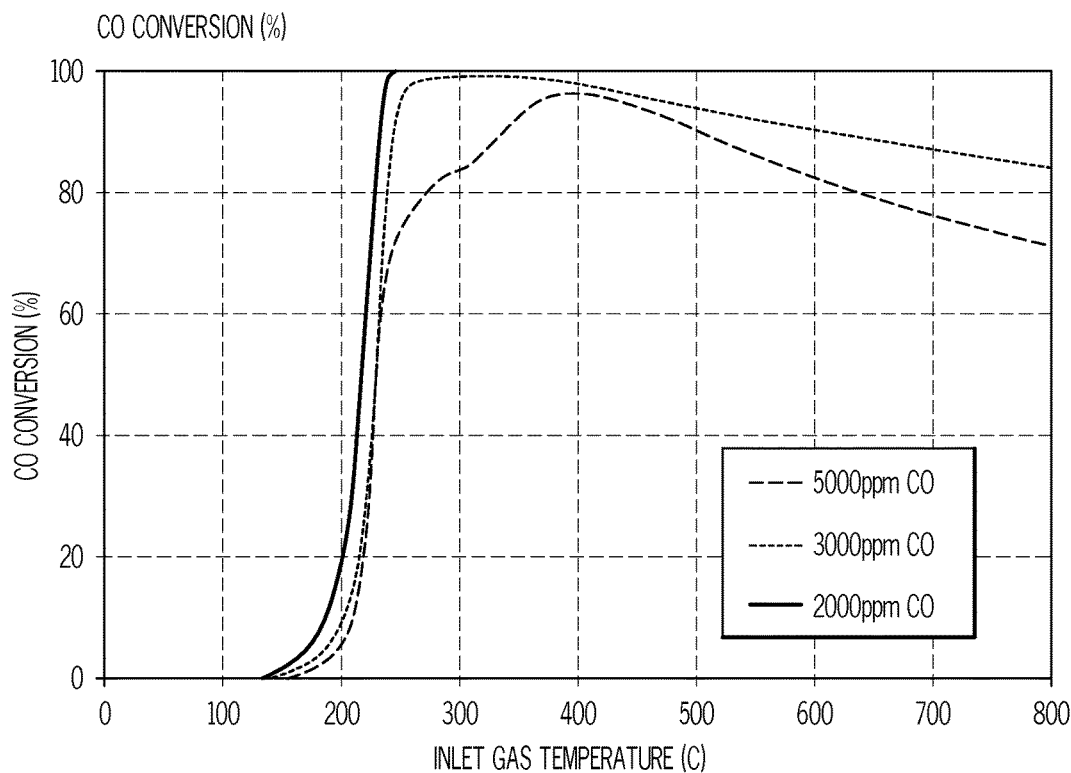
FIG. 11 is a plot of CO conversion versus inlet gas temperature for a Rh only catalyst under varying CO content in an exhaust gas.
Figure 12:
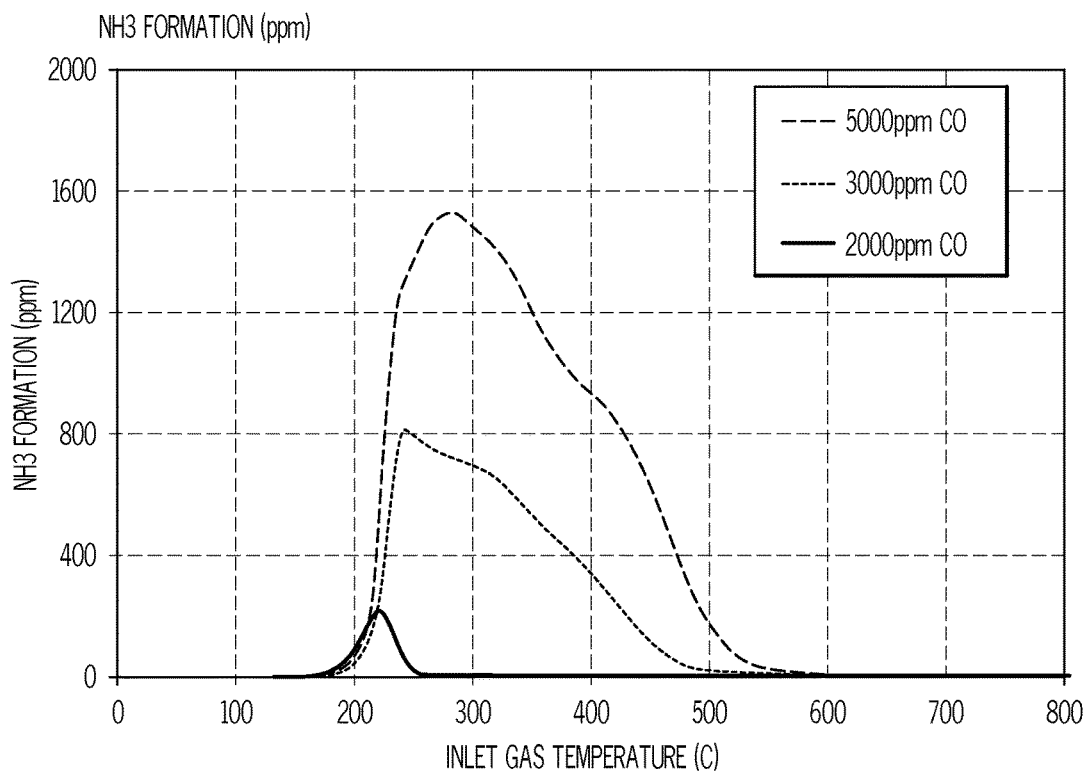
FIG. 12 is a plot of $NH_3$ formation versus inlet gas temperature for a Rh only catalyst under varying CO content in an exhaust gas.

Three different levels of CO were used, a stoichiometric level of CO (2000 ppm of both NO and CO, a Rich Level 1 of CO (2000 ppm NO and 3000 ppm CO), and a Rich Level 2 of CO (2000 ppm NO and 5000 ppm CO). The tests compared $NO_x$ conversion, $N_2O$ formation, CO conversion, and $NH_3$ formation using the two different catalysts at increasing gas inlet temperatures. As shown in FIGS. 5-8, for the Pd catalyst, rich levels of CO which are typically present in a lean burn engine inhibit $NO_x$ conversion (FIG. 5), cause $N_2O$ formation over a wider temperature range (FIG. 6), inhibit CO conversion (FIG. 7), and generate only low levels of $NH_3$ (FIG. 8). In comparison, as shown in FIGS. 9-12, the Rh catalyst achieved substantially 100% $NO_x$ conversion at 220° C. for all CO levels (FIG. 9), formed $N_2O$ at a catalyst temperature above 350° C. (FIG. 10), resulted in greater CO conversion at lower temperatures (FIG. 11), and generated relatively larger amounts of $NH_3$ (FIG. 12).

The results of the testing show that the Rh catalyst converted 50% of $NO_x$ compounds at lower temperatures (220° C. versus 270° C. for Pd), and was not affected by rich levels of CO, whereas the Pd catalyst was inhibited by 130° C. (compare FIGS. 5 and 9). Further, rich CO conditions resulted in $N_2O$ formation for the Pd catalyst over a broad temperature range whereas the Rh catalyst did not result in $N_2O$ formation above 350° C. (compare FIGS. 6 and 10). CO conversion under rich conditions shifted 330° C. for the Pd catalyst, while only 15° C. for the Rh catalyst (compare FIGS. 7 and 11). Rich CO levels did not affect the light-off temperature for the Rh catalyst, whereas the Pd catalyst was inhibited by 130° C. Finally, the Rh catalyst generated greater amounts of $NH_3$ via $H_2$ formation from the water gas shift reaction (compare FIGS. 8 and 12). Such increased $NH_3$ levels aid downstream palladium or palladium-enriched catalyst to enhance the conversion of any remaining $N_2O$ in the exhaust stream.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Unless the meaning is clearly to the contrary, all ranges set forth herein are deemed to be inclusive of all values within the recited range as well as the endpoints.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A catalyst system for reducing $N_2O$ emissions in an exhaust system of a vehicle comprising:
    a support in communication with an exhaust gas stream, said support including an exhaust gas inlet and an exhaust gas outlet and having at least one exhaust gas passage therethrough, said support comprising a first catalytic zone and a second catalytic zone positioned downstream from said first catalytic zone, said first catalytic zone including a PGM catalyst comprising from 50 to 100 wt % rhodium, with the remainder comprising palladium and/or platinum in any weight ratio, and said second catalytic zone including a PGM catalyst comprising from 50 to 100 wt % palladium, with the remainder comprising rhodium and/or platinum in any weight ratio, in which said second catalytic zone includes a nickel-copper catalyst.

2. The catalyst system as claimed in claim 1 in which said support comprises cerium oxide, zirconium oxide, aluminum oxide, and mixtures thereof.

3. The catalyst system as claimed in claim 1 in which said PGM catalyst in said first catalytic zone has a catalyst loading of from about 0.5 to about 300 gm/ft$^3$.

4. The catalyst system as claimed in claim 1 in which said PGM catalyst in said second catalytic zone has a catalyst loading of from about 0.5 to about 300 gm/ft$^3$.

5. The catalyst system as claimed in claim 1 in which said nickel-copper catalyst has a catalyst loading of from about 0.5 to about 2000 gm/ft$^3$.

6. The catalyst system as claimed in claim 1 in which said nickel-copper catalyst has a nickel to copper ratio of >1.

7. The catalyst system as claimed in claim 1 further including a third catalytic zone downstream from said second catalytic zone including a catalyst comprising nickel and copper.

8. The catalyst system as claimed in claim 7 in which said first catalytic zone in said exhaust gas passage comprises an inlet channel having first and second ends, said first end of said inlet channel communicating with said exhaust gas inlet, said second catalytic zone comprises an outlet channel having first and second ends, said second end of said outlet channel communicating with said exhaust gas outlet, and said third catalytic zone comprises an intermediate channel having first and second ends, said first end of said intermediate channel communicating with said second end of said inlet channel and said second end of said intermediate channel communicating with said first end of said outlet channel, wherein said intermediate channel is oriented such that a flow of exhaust gas through said at least one exhaust gas passage is reversed from a direction of flow in said inlet and outlet channels.

9. A catalyst system for reducing $N_2O$ emissions in an exhaust system of a vehicle comprising:
    a support in communication with an exhaust gas stream, said support including an exhaust gas inlet and an exhaust gas outlet and having at least one exhaust gas passage therethrough, said support comprising:
        a first catalytic zone and a second catalytic zone positioned downstream from said first catalytic zone, said first catalytic zone including a PGM catalyst comprising from about 50 to about 100 wt % rhodium, with the remainder comprising palladium and/or platinum in any weight ratio, and said second catalytic zone including a PGM catalyst comprising from about 50 to about 100 wt % palladium, with the remainder comprising rhodium and/or platinum in any weight ratio, and
        further including a third catalytic zone downstream from said second catalytic zone including a catalyst comprising nickel and copper,
        wherein said first catalytic zone in said exhaust gas passage comprises an inlet channel having first and second ends, said first end of said inlet channel communicating with said exhaust gas inlet, said second catalytic zone comprises an outlet channel having first and second ends, said second end of said outlet channel communicating with said exhaust gas outlet, and said third catalytic zone comprises an intermediate channel having first and second ends, said first end of said intermediate channel communicating with said second end of said inlet channel and said second end of said intermediate channel communicating with said first end of said outlet channel, and wherein said intermediate channel is oriented such that a flow of exhaust gas through said at least one exhaust gas passage is reversed from a direction of flow in said inlet and outlet channels.

\* \* \* \* \*